United States Patent [19]
Zwiep et al.

[11] 3,882,570
[45] May 13, 1975

[54] METHOD AND APPARATUS FOR REMOVING AN ANIMAL FOOT IN THE VICINITY OF THE TARSUS JOINT

[75] Inventors: Theodore C. Zwiep, Grand Rapids; Konrad H. Marcus; Ferdinand Weitz, both of Holland, all of Mich.

[73] Assignee: Prince Corporation, Holland, Mich.

[22] Filed: July 21, 1971

[21] Appl. No.: 164,781

Related U.S. Application Data

[62] Division of Ser. No. 14,503, Feb. 26, 1970, Pat. No. 3,657,771.

[52] U.S. Cl. .................................................. 17/1 R
[51] Int. Cl. ...................................................... A22c
[58] Field of Search ................... 17/52, 1 R, 11, 12

[56] References Cited
UNITED STATES PATENTS

| | | | |
|---|---|---|---|
| 3,038,197 | 6/1962 | Turner | 17/11 |
| 3,137,892 | 6/1964 | Best et al. | 17/11 |
| 3,199,143 | 8/1965 | Ousley et al. | 17/11 |
| 3,323,164 | 6/1967 | Bonuchi | 17/11 |
| 3,364,515 | 1/1968 | Brown et al. | 17/11 |
| 3,522,622 | 8/1970 | Crane | 17/11 |

*Primary Examiner*—Robert Peshock
*Attorney, Agent, or Firm*—Price, Heneveld, Huizenga & Cooper

[57] ABSTRACT

An apparatus for severing a portion of an animal leg uniformly at a fixed point near a joint such as the tarsus joint with respect to a reference position, the medial axes of the portions to be severed being generally aligned. The apparatus includes means for bending the joint so that the medial axes of the portions form an angle of approximately 90°, and means for severing the portion at a point spaced a predetermined distance along the medial axis of one of the portions from the intersection of the two medial axes. No matter what size the leg, the cut will occur at the same fixed point utilizing the same predetermined distance. To allow the joint to bend after rigor mortis has set in, means are provided for making a preliminary partial cut which, in case of a foot removal, cuts either the hamstring or the tuber calcis bone.

12 Claims, 19 Drawing Figures

INVENTORS
KONRAD H. MARCUS
THEODORE C. ZWEIP
FERDINAND WEITS
BY Price, Heneveld, Huizenga & Cooper
ATTORNEYS

PATENTED MAY 13 1975

INVENTORS
KONRAD H. MARCUS
THEODORE C. ZWEIP
FERDINAND WEITS

BY *Price, Heneveld, Huizenga & Cooper*

ATTORNEYS

INVENTORS
KONRAD H. MARCUS
THEODORE C. ZWEIP
FERDINAND WEITS
BY Price, Heneveld, Huizenga & Cooper
ATTORNEYS

METHOD AND APPARATUS FOR REMOVING AN ANIMAL FOOT IN THE VICINITY OF THE TARSUS JOINT

CROSS REFERENCE TO RELATED APPLICATION

This is a divisional application of commonly assigned parent application Ser. No. 14,503, filed Feb. 26, 1970, now U.S. Pat. No. 3,657,771 issued Apr. 25, 1972, and entitled METHOD AND APPARATUS FOR REMOVING AN ANIMAL FOOT IN THE VICINITY OF THE TARSUS JOINT.

BACKGROUND OF THE INVENTION

In cutting off portions of the leg of an animal, such as in a meat packing factory or a butcher shop, there is always the problem of locating the proper position for the cut. The problem is particularly acute in the case of pigs, wherein the foot must be removed from the leg to provide hams. There has long been desired a standard location for the cut, which is in the vicinity of the tarsus joint, inasmuch as the tendency of the seller is to cut too far down on the foot so as to include more bone in the leg of ham, the bone adding to the weight which determines the price the seller obtains. The buyer of course does not want that much bone inasmuch as it adds to the weight but does not contribute to the meat of the ham, as in the tarsus joint vicinity little useable meat is available. But the problem is not solely the tendency of the seller to cut the bone too long. The problem is also the complete uncertainty as to exactly where the cut is made inasmuch as there is no standard reference but merely an educated guess on the part of the cutter. This uncertainty will readily be appreciated when it is kept in mind that the cutter normally faces a wide variety of sizes and weights of hams for which the foot must be removed, ranging anywhere between ten pounds to sixty-five pounds. Because of this uncertainty and the fact that to the present day no standard method has been found to cut the foot off a ham, no assurance can be given that the buyer is purchasing a ham with the optimum amount of bone. This is despite the fact that the U.S. Department of Agriculture has been looking for a standard method.

A further problem resides in the fact that apparatus for deboning hams generally require a sufficient amount of tibia bone near the tarsus joint so as to be gripped properly by the apparatus. Legs which are cut too short do not provide such a grasping portion, and furthermore by cutting into the marrow portion of the bone rather than at the solid end portion of the tibia bone, the ham tends to sour or spoil. Also, bone structure is weakened in such short cuts so as to prevent proper functioning in the deboning apparatus.

Finally, the complete lack of a standard has required heretofore that the removal of the foot, or the severing of other portions of the leg, be done by hand inasmuch as automated machine processing requires standard reference positions for the cutting apparatus.

SUMMARY OF THE INVENTION

This invention relates to an apparatus which provides the severing of a leg of an animal, such as the ham leg in pork, always at the same location in the bone regardless of the variation in the weight or size of the leg. Specifically, the invention provides a means for removing a portion of a first animal leg in the vicinity of a joint such as a tarsus joint at a fixed point with regard to a reference, the medial axes of the two portions to be severed being generally aligned prior to severing. The apparatus utilizes means for bending the joint so that the medial axes of the portions are positioned at an angle to each other, such as an approximate 90° angle, and means for severing the portions at a point spaced along the medial axis of one of the portions a predetermined distance from the intersection of the medial axes. It has been found that an effective amount of bending for all legs is conveniently obtained by bending said joint so that the angle between the two parts of the leg forming the joint is approximately 90°, the inside surface of the part to be severed establishing a reference position, parallel to which the cut can be made. The apparatus also includes means for partially cutting into a portion of the leg to free the joint for the bending, so as to overcome the effects of rigor mortis.

Accordingly, it is an object of the invention to provide apparatus which will uniformly cut off a portion of an animal leg always at the same location in the vicinity of a joint regardless of the variance in size and weights of legs provided for severance.

It is further object of the invention to provide a apparatus of the above character wherein the severance is a foot of a pig, the severance occurring at the cloverleaf cross section in the tibia bone.

It is related object of the invention to provide a apparatus of the above character which will eliminate the need for a human operator providing the cutting or severing.

It is still another object to provide an apparatus of the above character which will allow commodity markets to establish a standard cut for such things as hams, thereby providing uniformity and certainty so that buyers are given the optimum buy.

Other objects and advantages will become apparent upon reference to the following drawings and detailed discussion.

DESCRIPTION OF THE PREFERRED EMBODIMENTS

The invention provides an apparatus for obtaining a reference position for severing a portion of a leg in the vicinity of a joint, the same reference position being utilized regardless of the size of the leg. The invention is particularly useful in the severance of the foot of a pig from the leg of ham.

Figures 1, 2:
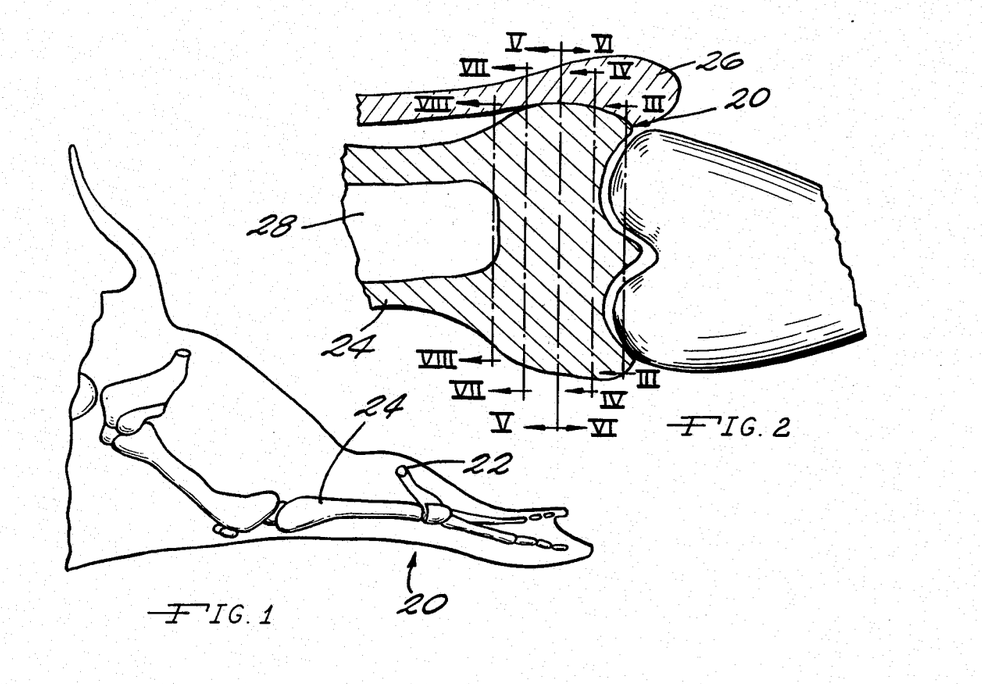
FIG. 1 is a partially sectioned, elevational view of a slaughtered pig illustrating the bones of a leg prior to the severing of the foot in accordance with the invention.
FIG. 2 is a fragmentary side elevational view, partially schematic and partially in section, illustrating the general position of the bones in the leg at one stage in the process.
Figure 3:
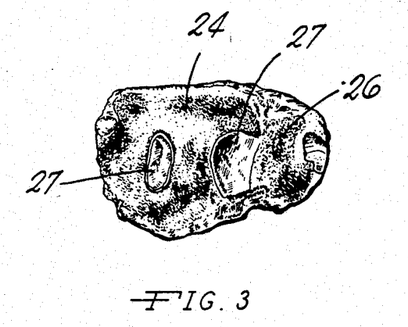
FIG. 3 is a sectional view taken approximately along lines III—III of FIG. 2 and illustrating a cut of the bones only which is considered to be too long on the leg, to the detriment of the buyer.
Figure 4:
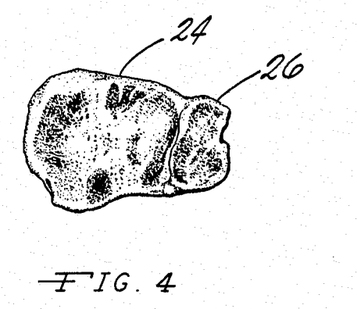
FIG. 4 is a sectional view taken along lines IV—IV of FIG. 2 and illustrating a cut which is acceptable.
Figure 8:
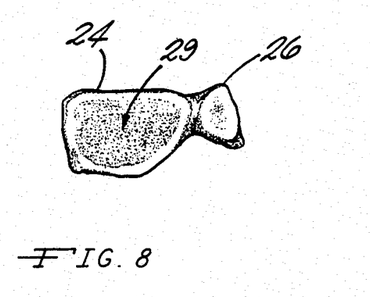
FIG. 8 is a sectional view taken along lines VIII—VIII of FIG. 2 and illustrating an unacceptable short position.

FIGS. 1 through 8 illustrate the general nature of the problem in cutting off the foot of a ham. FIGS. 1 and 2 show a portion of a ham on each side of the tarsus joint 20, the tarsus joint being the joint between the foot and the tibia and fibula bones. Thus, FIGS. 1 and 2 illustrate the tibia bone 24, the tarsus joint 20, the fibula bone 26, and the tuber calcis bone 22 forming the heel 23. FIGS. 3 through 8 show various cuts through the tarsus along the planes as shown in FIG. 2. For example, FIG. 3 illustrates a cut which is too long on the leg, the cut being through a portion of the joint 20 itself, and which is unacceptable inasmuch as in this region the fibula bone 26 and tibia bone 24 are fused. This region is readily identified by the presence of the condyles 27. The cut shown in FIG. 8 is also unacceptable inasmuch as it is too short, there being only a reduced cross section of the bone available for grasping by the deboning machine, and also there being insufficient bone structure due to the presence of the wall of the marrow cavity 28 (FIG. 2), which may cause ham souring. The marror cavity wall along apart from the bone structure shown in FIGS. 3 through 7 is not capable of sustaining stress, and is thus incapable of functioning properly in the deboning machine. Although the wall of the cavity parallel with section line VIII—VIII is shown in FIG. 2 as a finite surface, it appears that there is no clear demarcation of the beginning and end of that wall. However, it is clear that the portion of the "bone" designated as 29 (FIG. 8) is so porous and weak structurally that air can be readily blown through it.

Figure 5:
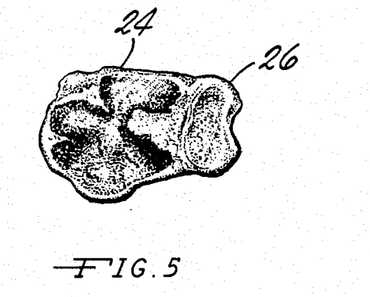
FIGS. 5 and 6 are sectional views taken along lines V—V and VI—VI of FIG. 2, respectively, representing the position known as a cloverleaf cross section.
Figure 6:
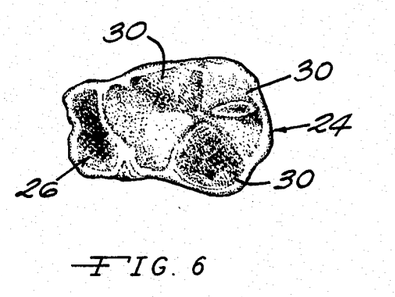
Figure 7:
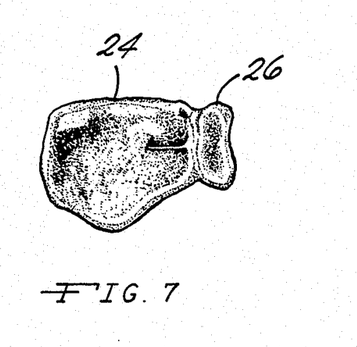
FIG. 7 is a sectional view taken along lines VII—VII of FIG. 2 and illustrating another acceptable cutting position.

FIGS. 4 through 7 illustrate acceptable cuts, an approximate eighth of an inch spacing occurring between each one and between each of the other cuts represented by FIGS. 3 through 8. The cut represented by the cross sections shown in FIGS. 5 and 6 is the ideal cut, the cut occurring at the point commonly called the cloverleaf in the tibia bone, the cloverleaf being identifiable from the three-lobes 30 in the tibia bone 24, as shown in FIG. 6. It is not clear what causes the formation of the cloverleaf, it being thought that each of the darker areas represent areas of bone and blood density differing from that of the lighter areas. The blood apparently is denser and the bone less dense in those areas which are darker. In any event, it has been found that by utilizing the method or the apparatus of the invention, 95 percent of the cuts will occur at the cloverleaf cross section.

Figure 9:
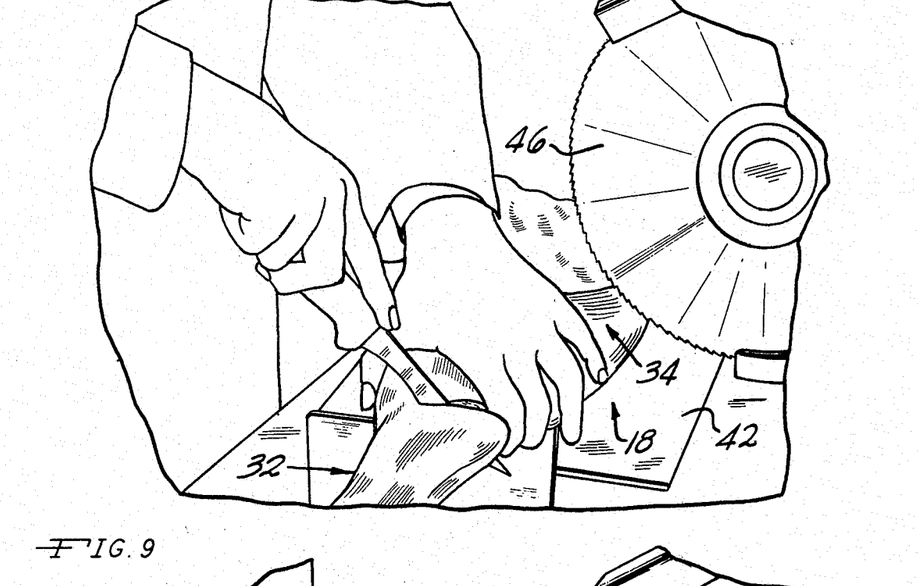
FIGS. 9 through 12 are perspective views illustrating steps in one embodiment of the process of the invention.
Figure 10:
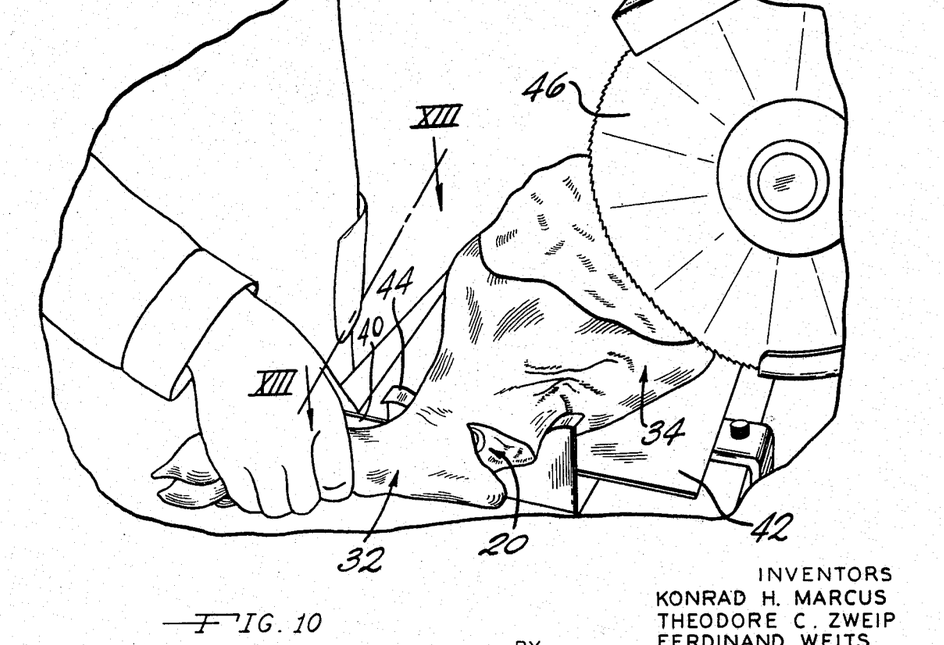
Figure 11:
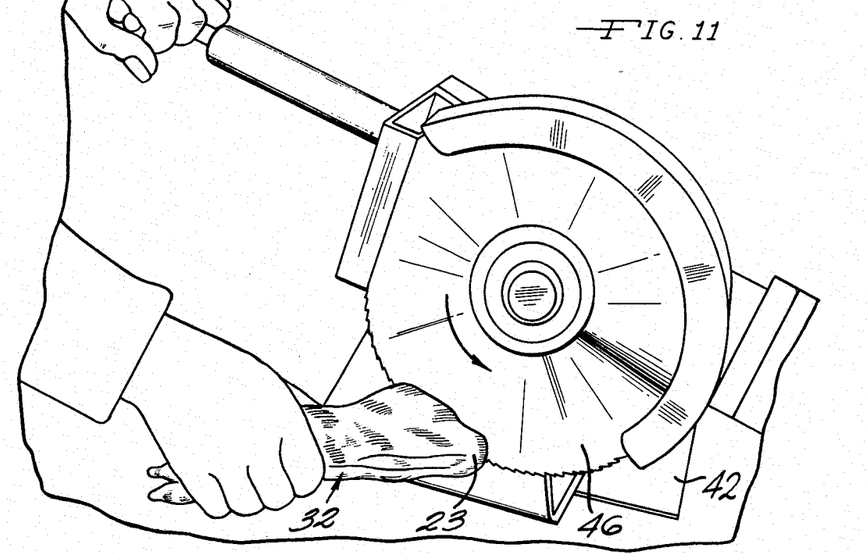
Figure 12:
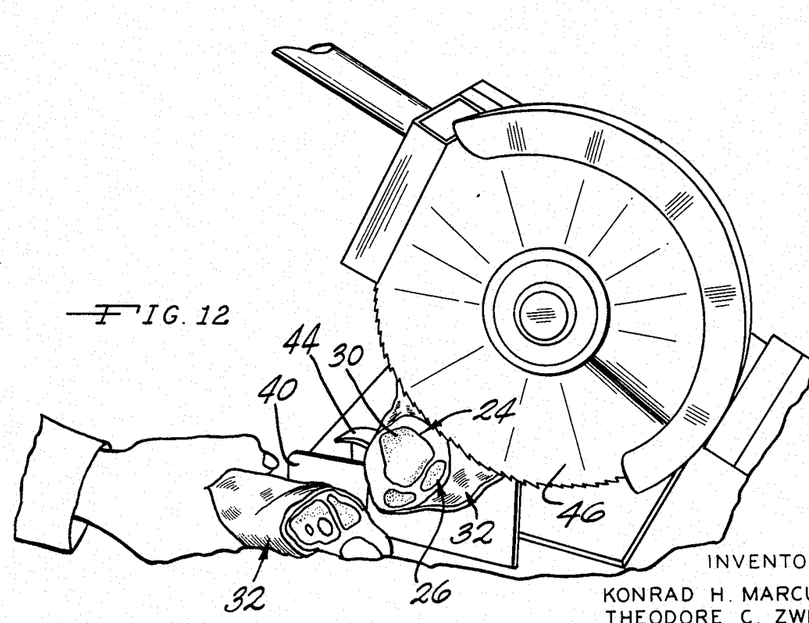
Figure 13:
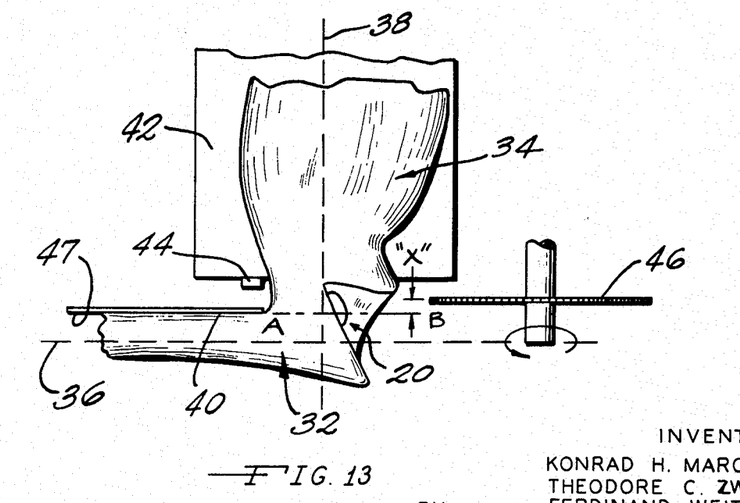
FIGS. 13 is a fragmentary, partially schematic plan view taken approximately along the lines XIII—XIII of FIG. 10.

FIGS. 9 through 13 illustrate the general process of the invention, the illustration depicting again a pig rear leg wherein the foot 32 is to be removed from the ham 34 of the leg. Initially, the medial axis 36 of the foot 32 and the medial axis 38 of the remainder of the leg 34 including the tibia are approximately aligned (FIG. 13), inasmuch as the pig carcass is hung prior to the butchering in such a way that rigor mortis causes the leg to set in this line of position. The presence of rigor mortis also requires a preliminary step so as to allow the bending operation which occurs thereafter. Thus, a partial cut is made as shown in FIG. 9 so as to cut either the hamstring or the tuber calcis bone itself, thereby allowing the tarsus joint 20 (FIG. 10) to rotate with the tuber calcis bone pivoting with the foot 32 out of the way. To establish a reference position on the leg 18 for the cutting step, the tarsus joint 20 is bent a substantial amount preferably to form an angle of approximately 90° between the medial axis 36 and 38 (FIG. 13). The reference position is the top of the foot 32, the top of the foot being defined as the surface opposite to the sole of the animal's foot, hoof, claws, or whatever type of appendange the leg of the animal has. In this case, the foot is what is bent 90° from the axis of the tibia bone, the top of the foot pressing so that it abuts flush against a rest 40 which is mounted in a plane approximately perpendicular to the axis of the tibia bone. The rest 40 is a sheet metal plate made, for example, from 14 gauge metal which is spaced from the table 42 upon which the leg 18 was originally positioned, a secondary rest 44 supporting the inside of the joint 20. The foot 32 is then completely removed from the leg 34 by severance, a rotating saw 46 or any other cutter being brought in to cut in a plane parallel to the plane of the rest 40. Line AB represents an extension of the surface 47 of rest 40, and the cut by the saw is made at a fixed distance X from the plane represented by the line AB, which is the plane of the top of the foot 32. It has been found that the distance X is preferably approximately three-eight of an inch so as to obtain the cloverleaf cut discussed above. Surprisingly, it has been discovered that using these dimensions and procedure, it does not matter what the size or weight of the leg 18 is. In sizes ranging from 10 to 45 pounds, the cut almost always comes out at the cloverleaf cross section. One explanation for this might be that establishing the reference position by the bending of the joint approximately 90° takes into account the fact that the anatomy of the leg 18 requires that the cloverleaf will always be in the same point relative to the bend regardless of the varying sizes of the leg.

It will be readily appreciated from FIGS. 12 and 13 that the saw cut, provided in this instance by the circular saw 46, proceeds until the saw is between the two rests 40 and 44.

Although the steps shown in FIGS. 9 through 13 utilize a hand bending of the foot, it will be readily appreciated that a pivoted bar could be utilized to force the foot to bend up against the rest 40.

APPARATUS

Figure 14:
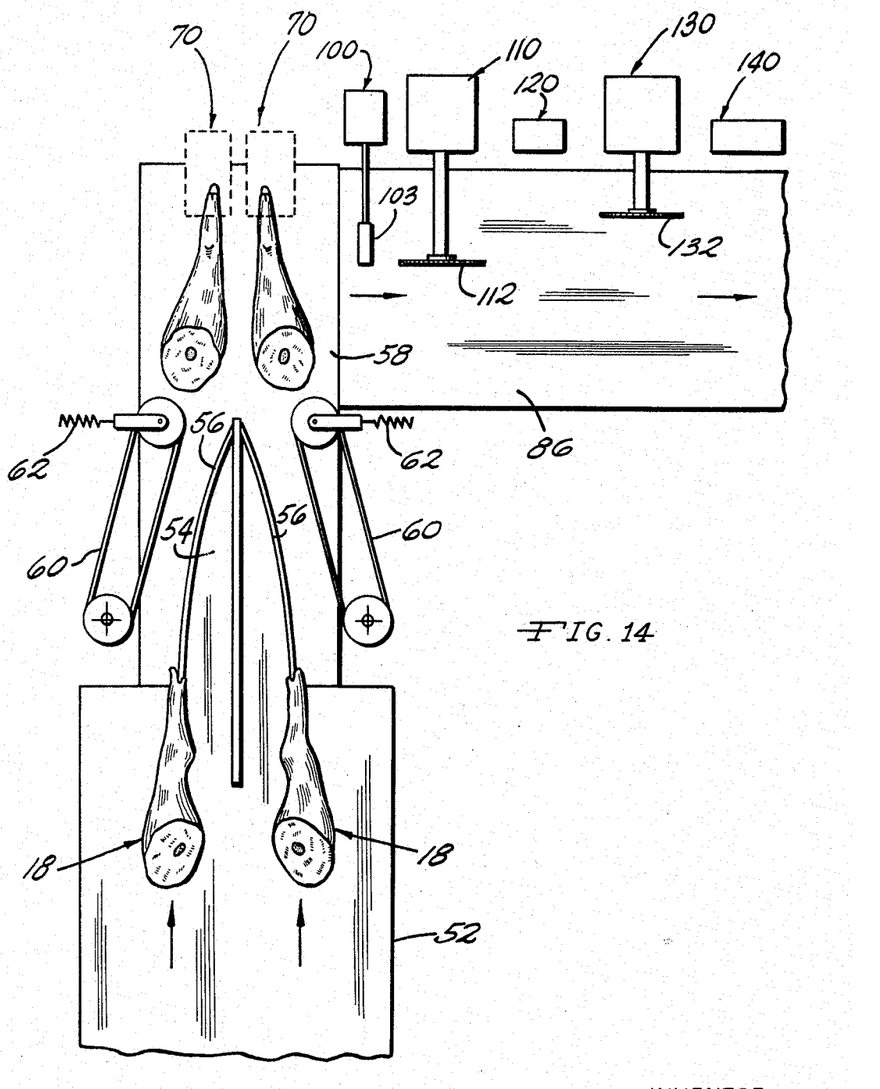
FIG. 14 is a schematic plan view illustrating one embodiment of the apparatus for practicing the invention.
Figure 15:
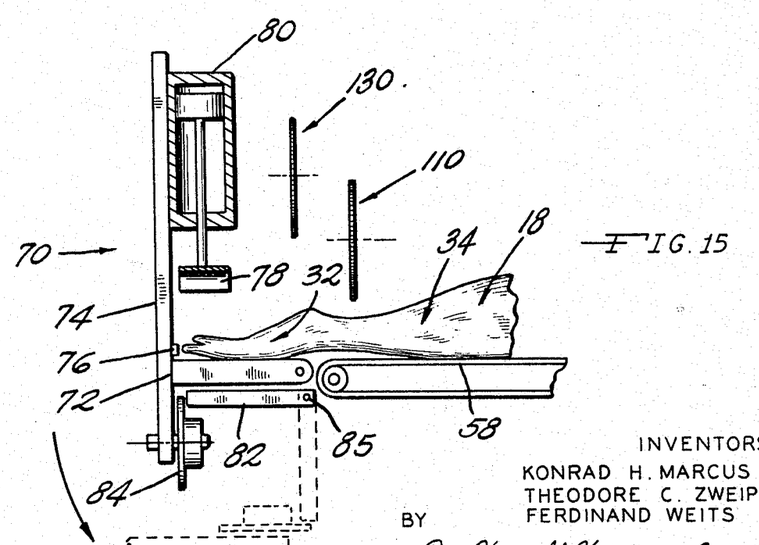
FIG. 15 is a fragmentary elevational view, partially schematic, illustrating the clamping mechanism utilized in FIG. 14.

FIG. 14 represents apparatus for accomplishing the aforedescribed method in an automatic manner. A pair of ham legs 18 are pushed by means (not shown) axially along a platform 52, the platform having a tongue 54 which is cut away at edges 56 so as to cause the hams to rotate outwardly as they drop onto a conveyor mechanism 58. Driven belts 60 spring biased toward each other by a mechanism 62 urges the hams inwardly towards the center of the belt 58 to the position shown at the top of the conveying means 58, where a clamping device 70 for each ham is positioned at the end of the conveyor 58. The clamping device comprises (FIG. 15) a rest 72 initially positioned in the same plane as the conveyor 58, a back plate 74 rising vertically from the rest 72 having thereon both a sensing switch 76 and a clamp 78. When the foot 32 of the leg 18 strikes the sensing switch 76, the clamp 78 of the clamping means 70 is actuated by a cylinder 80 so as to firmly hold the foot with its top flush with the surface of the rest 72. A drive means pulls the clamping mechanism 70 along a rail 82 by a means of wheels 84 journalled to the clamping means 70. The entire rail 82 is pivotable about a shaft 85, the pivoting action occurring as described hereinafter.

The clamping means 70 proceeds (FIG. 14) to carry the hams at right angles to the initial direction of travel established by the conveying means 58, the hams now being carried under various stations by the clamping mechanism and by a second conveyor means 86 which supports the remainder portion 34 of the leg 18. These stations are the sensing stations 100, the cutter 110, the bending station 120, the tarsus cutter 130, and the unclamping station 140.

Figure 16:
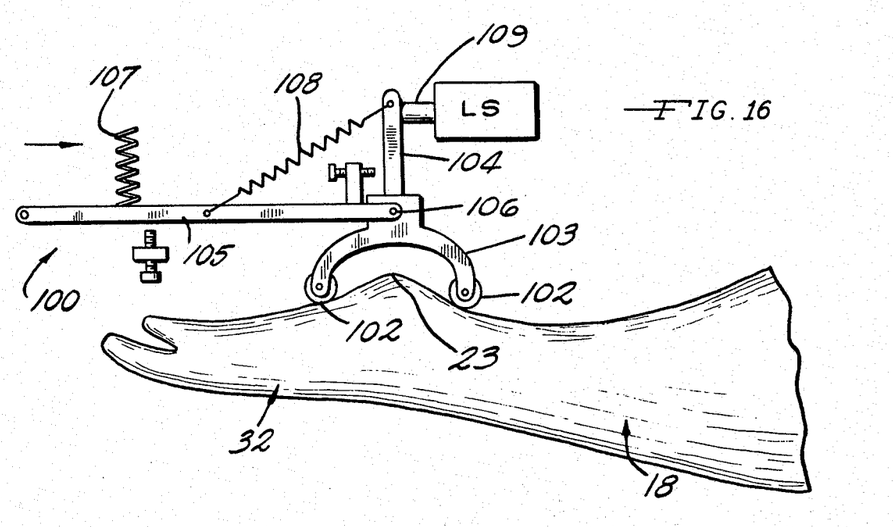
FIG. 16 is a partially schematic fragmentary elevational view illustrating the sensing mechanism utilized in FIG. 14.

The sensing station is shown in FIG. 16 and utilizes a mechanism for determining the location for the tendon or the hamstring cut. Although the cut can be made any place above the heel 23 of the leg 34, it is necessary for automatic operation to sense a relatively fixed position for each leg. Accordingly, the sensing station 100 comprises means for detecting the termination of the tuber calcis bone which in fact forms the heel 23. Specifically, the detecting means as shown in FIG. 16 includes a pair of rollers 102 rotatably mounted on a frame 103, the frame 103 being pivotally mounted on a lever 105 at a pivot 106. A preloading spring 107 presses against the top of the lever 105 to bias it downwardly against the incoming leg 18. A spring 108 is attached at its ends to both the lever 105 and a finger 104 extending from the frame 103 to bias the finger so as to normally position the rollers 102 in a non-horizontal plane which is non-parallel to the orientation of the leg 18. To sense the change in position of the plane of the rollers 102 into a plane parallel to the orientation of the leg 18, a limit switch 109 is positioned adjacent to the finger 104. Thus, when the rollers ride up and over the heel 23, the finger 104 activates the switch 109. The entire sensing station 100 is mounted for movement towards and away from the position of the leg 18 held by the clamping means 70. This mounting, not shown, also supports the cutter station 110, the entire mounting moving toward the conveyor means 86 until the limit switch 109 is activated by the finger 104. At this point, a signal is directed to the cutter so as to cut a portion of the leg 18 so as to sever the hamstring or tendon, or as an alternative described above, the tuber calcis bone.

Figure 18:
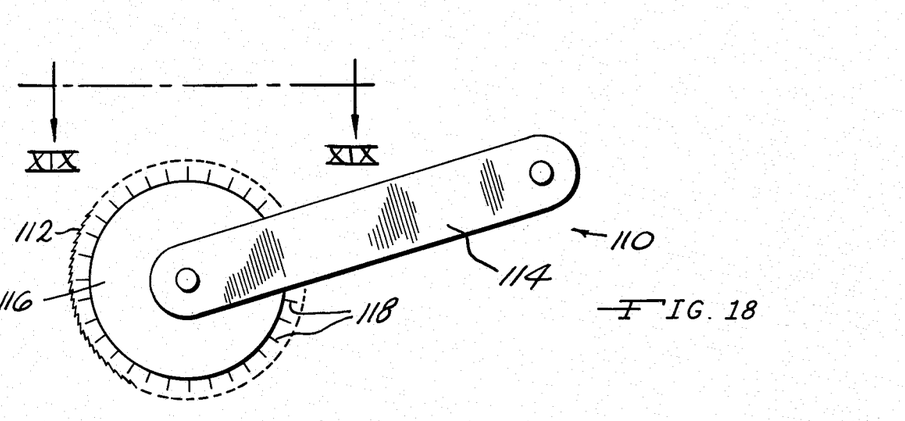
FIG. 18 is an elevational view of the tendon or hamstring cutter which may be utilized in the invention.
Figure 19:
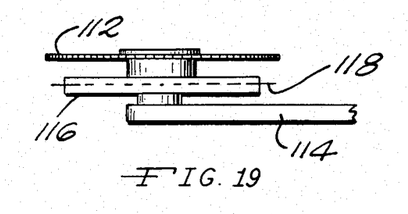
FIG. 19 is a plan view of the cutter illustrated in FIG. 18 and taken generally along the lines IXX—IXX.

The mechanism shown in FIGS. 18 and 19 can be utilized to limit the depth of cut of the cutter 110. The cutter is a rotating saw 112 mounted on an arm 114, the saw being positioned adjacent to a depth gauge wheel 116 having teeth 118 spaced around its periphery. The function of the teeth is to allow the depth gauge wheel and the blade to penetrate only a fixed distance, the distance being sufficient to cut the tendon or the tuber calcis bone, as desired.

The bending station 120 comprises simply a camming mechanism for rotating the clamping means 70 about the pivot 85, thereby bending the tarsus joint so that the foot 32 is approximately 90° downward from the position it occupied during the orientation stage. in this position, the foot is now ready for severance by cutting station 130, because the top of the foot as pressed flush against the clamp has established a reference position. The cutting station 130 comprises a saw or cutter 132 (FIG. 14), such as a circular saw, which is spaced a distance, which may be adjustable, from the surface of the support 72 in its downwardly rotated reference providing position shown in dotted lines in FIG. 15. For example, the distance could be three-eight of an inch as in the case of the method described above. The saw completely penetrates through the foot so as to sever it from the leg. Thereafter, the conveyor 86 moves the leg and foot to the unclamping station 140, where the cylinder 80 is deactivated so as to allow the foot 32 to be discarded.

Figure 17:
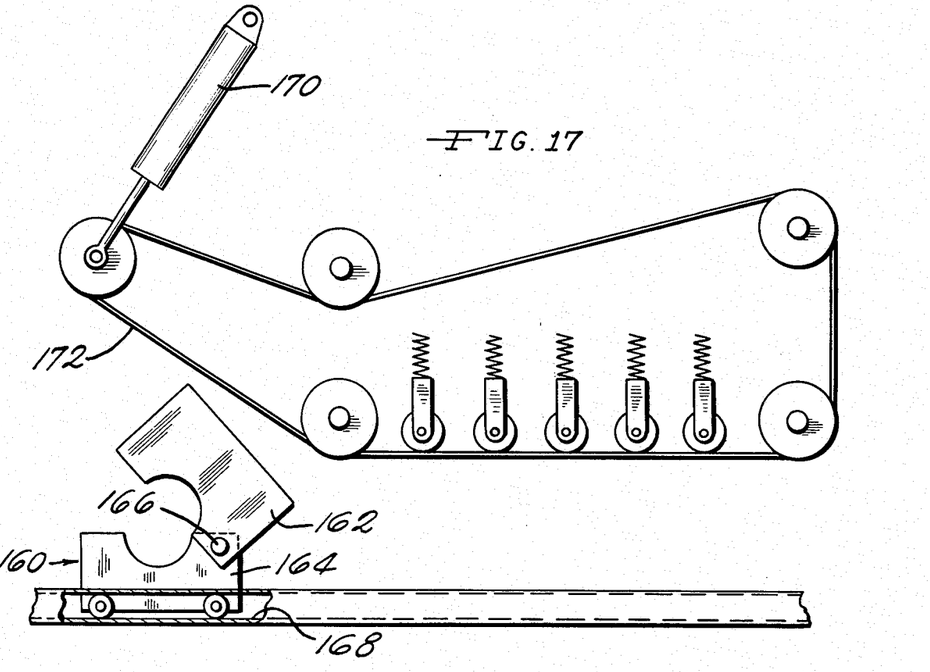
FIG. 17 is a schematic illustration of still another embodiment of the apparatus which can be utilized to practice the invention.

FIG. 17 illustrates an alternate embodiment for carrying out the invention, the apparatus as shown in FIG. 17 being designed to allow the remainder of the leg 34 rather than the foot 32 to pivot from its original position, thereby establishing the angle of approximately 90 degrees at the tarsus joint. Specifically, in the case of the embodiment of FIG. 17, the clamp 160 comprises two c sections 162 and 164 which pivot at 166, the clamp 160 being mounted on a track 168 with clamps 162 and 164 spring-biased into an open condition. An orienting conveyor similar to conveyor 58 moves the leg, with the top of the foot down, in the direction perpendicular to track 168 until a sensing switch is activated when the foot of the leg is in proper position within the clamp 160. At that time, a cylinder 170 is activated so as to lower a drive belt 172 in contact with the clamp 162, thereby closing the clamp means 160 flush onto both the top and bottom of the foot. The belt 172 continues to carry the clamp 160 along the track 168, the sensing stations 100 and 110 being utilized as in the previous embodiment to cut the hamstring or the tuber calcis so as to allow the tarsus joint to bend even after rigor mortis has set in. As the belt 172 continues to carry the clamp further along beyond the cutter station 110, the support underneath the leg terminates, so that only the foot 32 is held horizontal as initially oriented, the leg 34 thereby pivoting downwardly under the action of gravity so as to establish the approximate 90° bend. In this case, the severance cut is made by a saw oriented horizontally rather than vertically as in the embodiment shown in FIGS. 14 and 15. The cut of the saw is thus made at a fixed distance from the top of the foot, the reference position, held in the clamping means 160.

The belt 172 is an endless belt which is driven by a plurality of rollers as shown in FIG. 17, the belt carrying the clamp to a final station which is the point at which the belt leaves the vicinity of the track 168, thereby opening the clamp and allowing the foot which has been severed from the leg to be removed from the clamping means 160.

As in the case of the method described in connection with FIGS. 9 through 13, utilizing the aforedescribed apparatus in FIGS. 14 through 19 will insure that the cut occurs almost invariably at the cloverleaf section of the tibia bone regardless of variance in size of the legs 18 which are fed into the apparatus.

It would be readily appreciated that other embodiments of the aforedescribed apparatus can be utilized within the scope of the invention. For example, the reference position on the leg need not be the top of the foot but can rather be the null point of the bending of the foot. That is, a point occurs above the plane of rotation of the foot and specifically above the tarsus joint wherein no or a minimum of rotation occurs when the foot is bent. This point can be determined by a sensing means positioned aligned approximately with the axis of the tarsus joint, two adjacent rotating surfaces causing the foot to bend back and fourth with respect to the leg until the null point is located. The tarsus cutter can then be positioned to cut a fixed distance from that null point.

The embodiments of the invention in which an exclusive property or privilege is claimed are defined as follows:

1. Apparatus for removing the foot portion of an edible mammal leg from the ham portion of the leg by cutting through the bone of the ham portion in the vicinity of the tarsus joint between said portions comprising:
    a. first alignment means for establishing the alignment of the medial axis of the ham portion of the leg along a given axis;
    b. second alignment means for aligning said foot portion to establish a predetermined amount of bending of said joint and thus a predetermined angle between the medial axes of said leg portions;
    c. bending means for bending the joint said predetermined amount to establish said predetermined angle between said portions; and
    d. severing means located at a predetermined distance from the medial axis of said foot portion for severing the leg in the vicinity of said joint; said severing means having a cutting surface and means for directing said cutting surface for relative movement with respect to said leg on a path located along the medial axis of said foot portion, said path being located along a plane spaced said predetermined distance from the medial axis of said foot portion; means for causing relative movement of said severing means with respect to said leg along said path whereby said severing means will transversely cut only through a predetermined place of said bone of said ham portion.

2. The apparatus as defined in claim 1, wherein said bending means includes an actuator mounted for bending said foot portion so that its medial axis is rotated approximately 90° with respect to the medial axis of said second portion.

3. The apparatus as defined in claim 1 and further including a horizontal surface; said bending means including horizontal clamping means for clamping only the foot portion to be removed, said clamping means being mounted for movement away from said surface, means for closing said clamping means in response to a signal, and means for moving said clamping means away from said surface, whereby the remainder of the leg pivots about the joint until it is bent approximately 90° with respect to its original position.

4. The apparatus as defined in claim 1, and further including means for partially cutting into a portion of the leg to free the joint for rotation, thereby overcoming the effects of rigor mortis.

5. The apparatus as defined in clalim 4, wherein said partial cutting means includes detecting means for detecting the termination of the tuber calcis bone at its end opposite to where it joins the tarsus joint.

6. The apparatus as defined in claim 5, wherein said detecting means includes a lever, a pair of rollers sharing a common frame, said frame being pivotally mounted on the end of said lever, means biasing said lever and said frame towards the leg, means biasing said frame so as to normally position said rollers in a non-horizontal plane, and a limit switch positioned to be activated by said frame when said plane is horizontal.

7. Apparatus for uniformly removing the foot portion from the ham portion of various sized legs of an edible mammal leg by cutting through the tibia bone at the approximate vicinity of the cloverleaf cross section of the tibia bone, said apparatus comprising:
    a. orienting means for orienting each said leg in a prescribed direction;
    b. means for bending said foot portion and ham portion an effective amount with respect to each other to form an angle between the medial axes thereof;
    c. means for controlling the amount of bending so as to establish a predetermined angle between said axes;
    d. severing means for severing the foot from the leg at the cloverleaf of the tibia bone, said severing means being positioned at a predetermined distance from the medial axis of said foot portion for severing the leg in the vicinity of said joint; said severing means having a cutting surface and means for directing said cutting surface for relative movement with respect to said leg on a path located along the medial axis of said foot portion, said path being located along a plane spaced said predetermined distance from the medial axis of said foot portion; means for causing relative movement of said severing means with respect to said leg along said path whereby said severing means will transversly cut only through a predetermined place of said bone of said ham portion.

8. The apparatus as defined in claim 7, wherein said predetermined distance is approximately three-eights of an inch.

9. The apparatus as defined in claim 7, wherein said bending means includes means for bending the joint between said foot and said remaining portion approximately 90°.

10. The apparatus as defined in claim 8, wherein said approximate 90° bending means includes a clamp mounted for approximately 90° rotation with respect to said orienting means, and means for rotating said clamp approximately 90° with respect to said orienting means.

11. The apparatus as defined in claim 8, wherein said approximate 90° bending means includes a rest mounted approximately 90° to said direction.

12. The apparatus as defined in claim 9, wherein said orienting means includes a horizontal surface and horizontal clamping means for clamping only the foot to be removed, said clamping means being mounted for movement away from said surface, means for moving said clamping means in response to a signal, and means for moving said clamping means away from said surface, whereby the leg pivots about the joint until it is bent approximately 90° with respect to its original position.

* * * * *